(12) United States Patent
Lee et al.

(10) Patent No.: US 7,514,693 B2
(45) Date of Patent: Apr. 7, 2009

(54) MULTIDIRECTIONAL ULTRAVIOLET SENSOR

(75) Inventors: Chun-Yuan Lee, Hsinchu (TW); Ming-Hann Tzeng, Miaoli (TW)

(73) Assignee: Ghitron Technology Co., Ltd., Chutung Hsinchu (TW)

( * ) Notice: Subject to any disclaimer, the term of this patent is extended or adjusted under 35 U.S.C. 154(b) by 0 days.

(21) Appl. No.: 11/808,281

(22) Filed: Jun. 8, 2007

(65) Prior Publication Data

US 2008/0128632 A1 Jun. 5, 2008

(30) Foreign Application Priority Data

Jun. 13, 2006 (TW) ............................... 95121090 A

(51) Int. Cl.
  *G01J 1/42* (2006.01)
(52) U.S. Cl. ...................................... 250/372
(58) Field of Classification Search .............. 250/474.1, 250/372
See application file for complete search history.

(56) References Cited

U.S. PATENT DOCUMENTS

| 6,114,704 | A  * | 9/2000 | Buck ........................ 250/372 |
| 2003/0160176 | A1 * | 8/2003 | Vispute et al. .............. 250/372 |
| 2003/0178571 | A1 * | 9/2003 | Nayfeh et al. ............... 250/372 |
| 2007/0170366 | A1 * | 7/2007 | Lin et al. .................... 250/372 |

\* cited by examiner

*Primary Examiner*—Christine Sung
(74) *Attorney, Agent, or Firm*—Rosenberg, Klein & Lee

(57) ABSTRACT

A multidirectional ultraviolet sensor includes a substrate and a UV-sensitive layer. The UV-sensitive layer contains nano-sized or micro-sized particles of a UV-sensitive material, which is attached to a top surface of the substrate by sintering process to enable sensing of ultraviolet light incident on the ultraviolet sensor from various directions. The UV-sensitive layer is in contact with a first and a second electrode layer, which are arranged at the top surface or the bottom surface the UV-sensitive layer in the same horizontal plane, or respectively at two opposite sides of the UV-sensitive layer. Since an impedance value of the UV-sensitive layer changes in response to an intensity of incident ultraviolet light, the intensity of the incident ultraviolet light is measured by detecting the impedance of the UV-sensitive layer.

17 Claims, 5 Drawing Sheets

MULTIDIRECTIONAL ULTRAVIOLET SENSOR

FIELD OF THE INVENTION

The present invention relates to an ultraviolet sensor, and more particularly to a multidirectional ultraviolet sensor.

BACKGROUND OF THE INVENTION

With the highly developed technology in the modern society, all kinds of sensors are conveniently used in people's daily life for a wide range of applications, from product counting and quality test in a factory to air-conditioning temperature test and TV remote control in one's house.

Among others, a photo-sensor is a very commonly used sensor, in which a photo-sensitive cell is used to convert a photo signal into an electric signal.

However, all the currently available photo-sensitive cells have a sensible wavelength range fallen around the visible region of the electromagnetic spectrum, such as the ultraviolet wavelength and the infrared wavelength; and the currently available photo sensors are not only used for measuring light intensity, but also very frequently used as a detection element for forming other types of sensors.

Infrared sensors, ultraviolet sensors, optical fiber sensors, color sensors, and CCD (charge-coupled device) image sensors are some of the currently very typical light sensors. In recent years, due to some newly emerged demands, the detection of ultraviolet light has aroused the attention of people. Advanced ultraviolet detecting instruments are required by both civil and military industries. They are used in engine control, solar ultraviolet monitoring, light source calibration, ultraviolet astronomy, flame sensor, guided-missile plume measurement, air-to-air safety communication, etc.

An ultraviolet sensor is a photoelectric device exclusively used for detecting the existence of ultraviolet light. The ultraviolet sensor is highly sensitive to ultraviolet light, particularly to the ultraviolet light produced during the combustion of wood, chemical fabrics, paper, oil, plastic, rubber, and combustible gases.

FIG. 1 is a sectional view of a conventional ultraviolet sensor 1. As shown, the ultraviolet sensor 1 includes a substrate 11, on which a first electrode layer 12, a photo-sensitive layer 13, and a second electrode layer 14 are sequentially formed. Wherein, the first electrode layer 12 is a light-pervious conducting layer, so that the photo-sensitive layer 13 is exposed to ambient ultraviolet light L. The UV-sensitive layer 13 is formed by stacking a layer of p-type semiconductor membrane and a layer of n-type semiconductor membrane.

The first electrode layer 12, the UV-sensitive layer 13, and the second electrode layer 14 of the ultraviolet sensor 1 together form a current loop. When being exposed to ultraviolet light, the UV-sensitive layer 13 releases electrons. At this point, the first electrode layer 12 is electrically connection to the second electrode layer 14 and a current is produced. By measuring an intensity of the current in the current loop, the intensity of ultraviolet light received by the ultraviolet sensor 1 can be estimated.

Generally, an ultraviolet sensor uses a UV-sensitive layer to receive ambient ultraviolet light. In the conventional ultraviolet sensor, the UV-sensitive layer is usually configured as a flat surface. This type of UV-sensitive layer having a flat surface can only respond to ultraviolet light incident on the flat surface from a particular direction, and is not able to receive incident ultraviolet light from different directions. Moreover, the flat surface of the UV-sensitive layer would reflect part of the ultraviolet light incident thereon at some incidence angles and the reflection inevitably and adversely reduces the accuracy of the ultraviolet sensor in measuring ultraviolet light.

Furthermore, most UV-sensitive layers of the conventional ultraviolet sensors are of a diode membrane structure, which have poor voltage endurance capability and accordingly, have adverse influence on the voltage endurance capability of the ultraviolet sensors and they largely shorten the usable lives of the ultraviolet sensors.

SUMMARY OF THE INVENTION

A primary object of the present invention is to provide a multidirectional ultraviolet sensor that includes a UV-sensitive layer formed by sintering particles of a UV-sensitive material onto a top surface of a substrate of the ultraviolet sensor, which is able to receive ultraviolet light incident thereon from different directions.

Another object of the present invention is to provide an impedance-type ultraviolet sensor, which includes a UV-sensitive layer formed by attaching particles of a UV-sensitive material to a top surface of a substrate of the ultraviolet sensor through sintering, rendering the UV-sensitive layer an electric property of impedance.

A further object of the present invention is to provide a high-voltage endurable ultraviolet sensor that includes a UV-sensitive layer formed by attaching particles of a UV-sensitive material to a substrate of the sensor through sintering, rendering the UV-sensitive layer has relatively high-voltage endurance capability.

To fulfill the above objects, a multidirectional ultraviolet sensor including a substrate and a UV-sensitive layer is provided. The UV-sensitive layer contains nano-sized or micro-sized particles of a UV-sensitive material, which is attached to a top surface of the substrate by sintering to enable sensing of ultraviolet light incident on the ultraviolet sensor from different directions. The UV-sensitive layer is in contact with a first electrode layer and a second electrode layer spaced from the first electrode layer, which may be arranged at the top surface or the bottom surface of the UV-sensitive layer in the same horizontal plane, or respectively at two opposite sides of the UV-sensitive layer. Since an impedance value of the UV-sensitive layer changes in response to an intensity of incident ultraviolet light, the intensity of the incident ultraviolet light is measured by detecting the impedance value of the UV-sensitive layer.

With the UV-sensitive layer provided thereon, the multidirectional ultraviolet sensor of the present invention is able to receive ultraviolet light incident thereon from different directions. Therefore, the problems in the conventional ultraviolet sensor of responding only to the ultraviolet light incident from one particular direction and reflecting ultraviolet light at some incidence angles can be overcome. Moreover, since the UV-sensitive layer of the ultraviolet sensor of the present invention is formed by sintering of nano-sized or micro-sized particles of a UV-sensitive material, the ultraviolet sensor produced is an impedance-type ultraviolet sensor. The ultraviolet sensor may be used in general circuit applications due to its impedance property. The UV-sensitive layer included in the present invention also gives the ultraviolet sensor very good voltage endurance capability, making the ultraviolet sensor of the present invention very valuable in many industrial and commercial fields.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
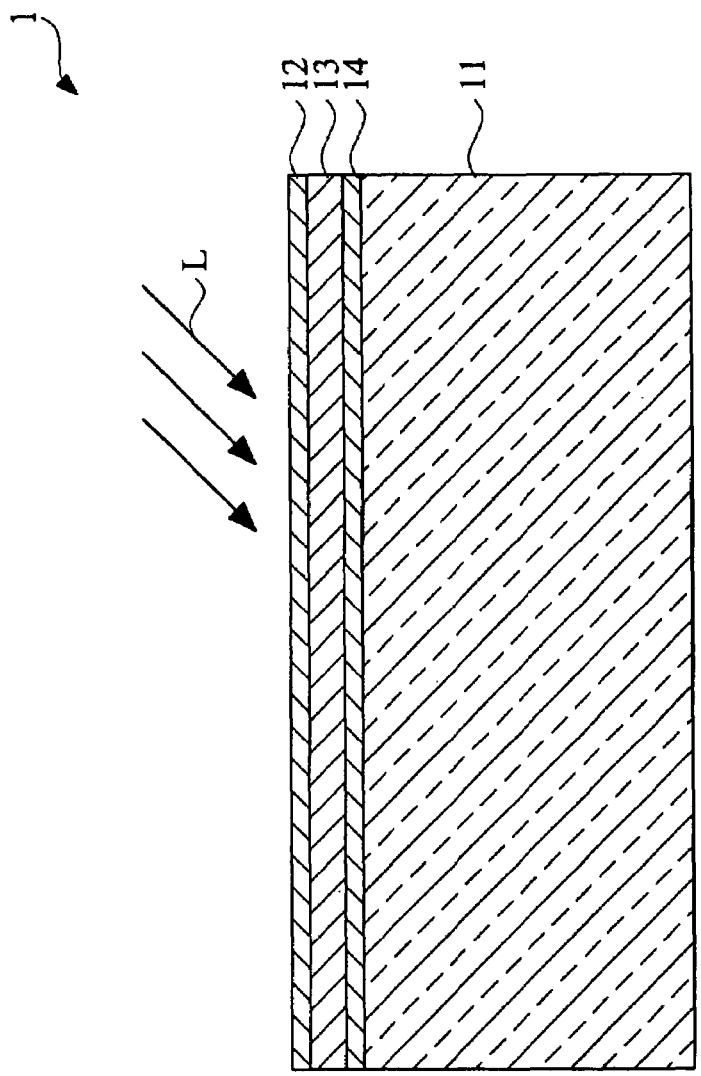
FIG. 1 is a sectional view of a conventional ultraviolet sensor.
Figure 2:
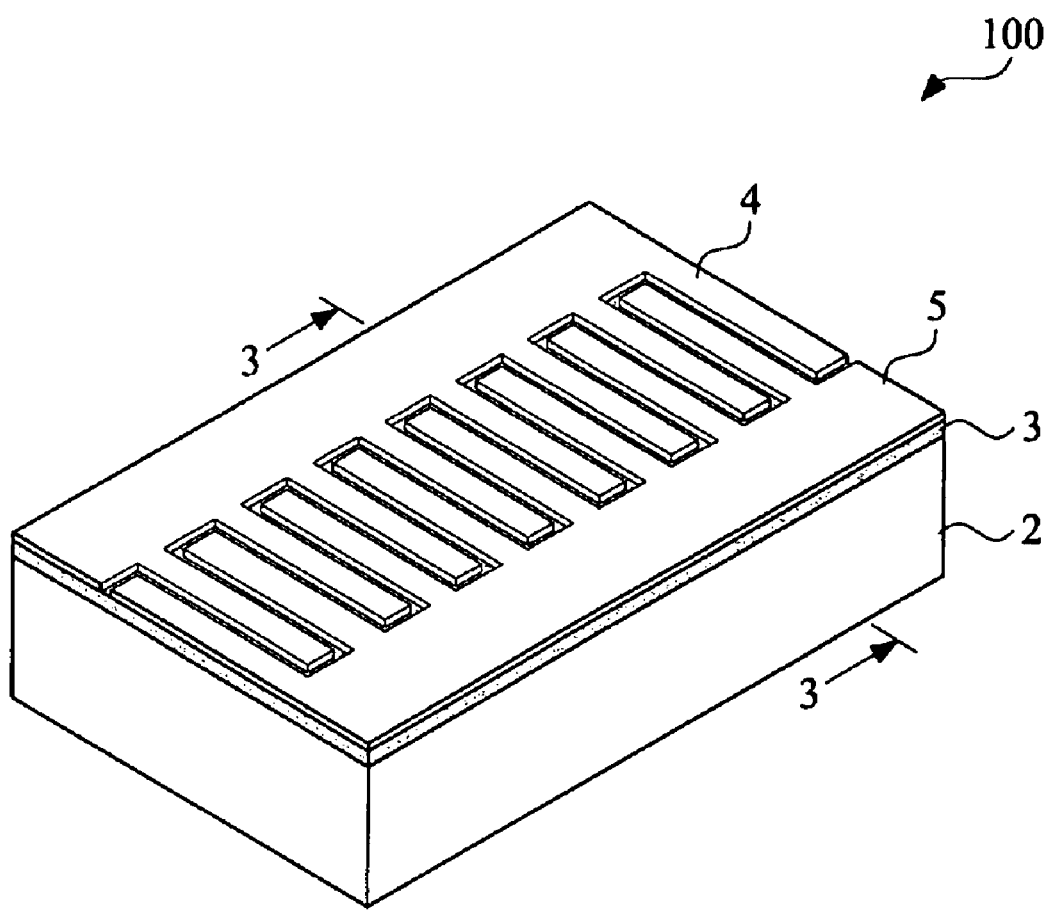
FIG. 2 is a perspective view of a multidirectional ultraviolet sensor according to a first embodiment of the present invention.

Please refer to FIG. 2 that is a perspective view of a multidirectional ultraviolet sensor 100 according to a first embodiment of the present invention. As shown, the ultraviolet sensor 100 includes a substrate 2, on a top surface of which there is formed of a UV-sensitive layer 3. The substrate 2 may be made of a glass material or a ceramic material or any other suitable material, depending on the field in which the ultraviolet sensor 100 is to be applied.

The UV-sensitive layer 3 has a predetermined initial impedance value. A first electrode layer 4 and a second electrode layer 5 are both formed on a top surface of the UV-sensitive layer 3, such that the first and the second electrode layers 4, 5 all are in contact with the UV-sensitive layer 3 and located at the same horizontal plane. The second electrode layer 5 is spaced from the first electrode layer 4.

The first electrode layer 4 and the second electrode layer 5 are two intermeshed comb structures arranged on the top of the UV-sensitive layer 3. The first and the second electrode layers 4, 5 may be configured depending on the field in which the ultraviolet sensor 100 is to be applied. For example, the first and the second electrode layers 4, 5 may be configured as a flat plate. Both of the first and the second electrode layers 4, 5 are made of an electrically conductive material, so that a current loop is formed between the UV-sensitive layer 3, the first electrode layer 4, and the second electrode layer 5.

Figure 3:
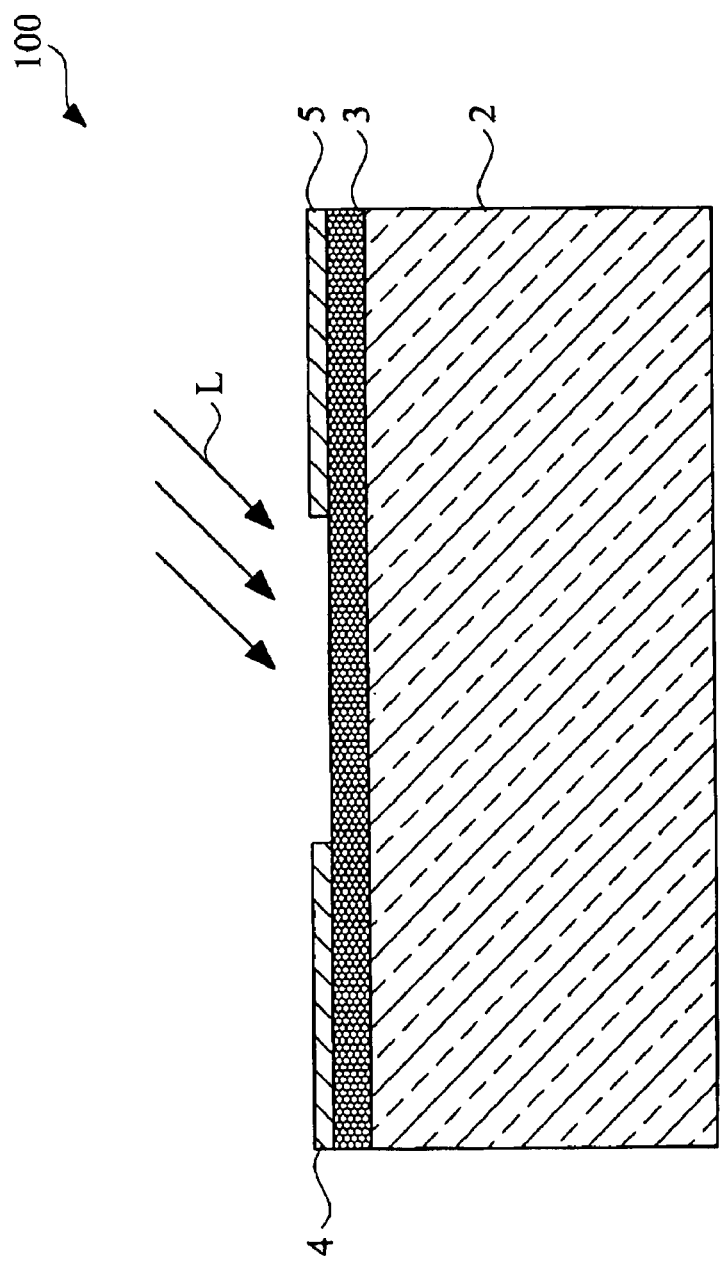
FIG. 3 is a sectional view taken along line 3-3 of FIG. 2.

Please refer to FIG. 3 that is a sectional view taken along line 3-3 of FIG. 2. As shown, the UV-sensitive layer 3 comprises particles of a UV-sensitive material, which is applied on a top surface of the substrate 2 and then attached to that surface through a process of sintering, so that the UV-sensitive layer 3 is adapted to receive ambient ultraviolet light L. The particulate UV-sensitive material may be a material containing zinc oxide, titanium dioxide, or silicon carbide, or any other suitable material, depending on the field in which the ultraviolet sensor 100 is to be applied. Moreover, the particles of the UV-sensitive material may be nano-sized particles having a size smaller than 100 nanometers, or micro-sized particles having a size smaller than 30 micrometers.

The UV-sensitive layer 3 has an impedance value that changes in response to an intensity of the ultraviolet light L being received. When the UV-sensitive layer 3 receives ultraviolet light L that has a relatively low intensity, the relatively high initial impedance value of the UV-sensitive layer 3 would become reduced. And, when the UV-sensitive layer 3 receives ultraviolet light L that has a relatively high intensity, the impedance value of the UV-sensitive layer 3 would reduce further. At this point, a voltage may be applied across the first and the second electrode layer 4, 5, and a current loop would formed between the first electrode layer 4, the UV-sensitive layer 3, and the second electrode layer 5. Since a current value in the current loop changes with the impedance value of the UV-sensitive layer 3, from the detected current value, the intensity of the ultraviolet light is calculated by the ultraviolet sensor 100.

Figure 4:
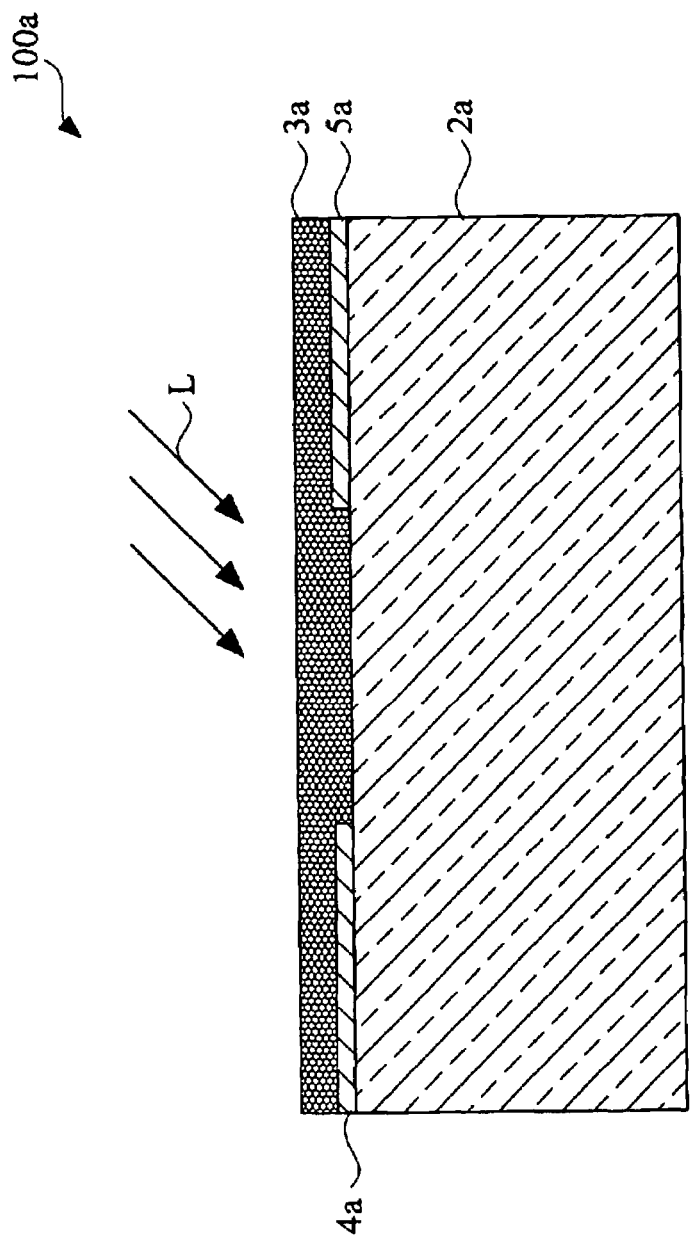
FIG. 4 is a sectional view of a multidirectional ultraviolet sensor according to a second embodiment of the present invention.

Please refer to FIG. 4 that is a sectional view of a multidirectional ultraviolet sensor 100a according to a second embodiment of the present invention. As shown, the second embodiment is generally structurally similar to the first embodiment, and includes a substrate 2a, a UV-sensitive layer 3a, a first electrode layer 4a, and a second electrode layer 5a. However, the ultraviolet sensor 100a of the second embodiment differs from the ultraviolet sensor 100 of the first embodiment in that the first electrode layer 4a and the second electrode layer 5a in the ultraviolet sensor 100a are directly formed on a top surface of the substrate 2a in the same horizontal plane. Similarly, the second electrode layer 5a is spaced from the first electrode layer 4a. The UV-sensitive layer 3a is applied over the substrate 2a to cover the first and the second electrode layers 4, 5.

Figure 5:
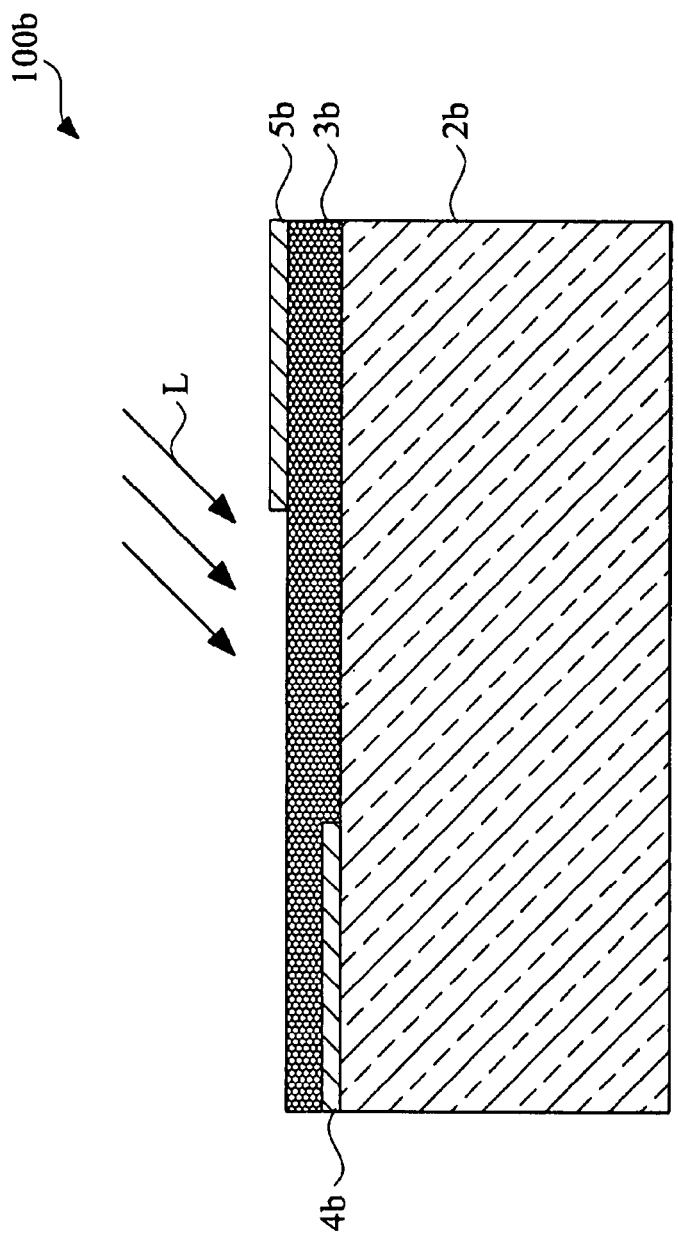
FIG. 5 is a sectional view of a multidirectional ultraviolet sensor according to a third embodiment of the present invention.

FIG. 5 is a sectional view of a multidirectional ultraviolet sensor 100b according to a third embodiment of the present invention. As shown, the third embodiment is generally structurally similar to the first and the second embodiment, and includes a substrate 2b, UV-sensitive layer 3b, a first electrode layer 4b, and a second electrode layer 5b. However, the ultraviolet sensor 100b differs from the ultraviolet sensors 100 and 100a in that the first electrode layer 4b is directly formed on a top surface of the substrate 2b, the UV-sensitive layer 3b is applied over the same surface of the substrate 2b to cover the first electrode layer 4b and the exposed top surface of the substrate 2b, and the second electrode layer 5b is then formed on a top surface of the UV-sensitive layer 3b.

In practical application of the present invention, the first electrode layers 4, 4a, 4b and the second electrode layers 5, 5a, 5b may be located at different surfaces of the main bodies 2, 2a, 2b, depending on the application field of and the actual demands for the ultraviolet sensors 100, 100a, 100b. And, the particles for forming the UV-sensitive layers 3, 3a, 3b may also be differently shaped according to the application field of the ultraviolet sensor 100, 100a, 100b. For example, the particles may be in the form of granules, bars, or other irregular shapes. The nano-sized or micro-sized particles of the UV-sensitive material may be otherwise screen printed on the top surface of the substrate and then subjected to sintering to be finally attached to the substrate and form the UV-sensitive layers 3, 3a, 3b.

As can be understood by those having ordinary skill in the art, an appropriate binder may be added during the process of sintering to the nano-sized or micro-sized particles of the UV-sensitive material, so as to give the UV-sensitive material an increased hardness. For example, when a proper amount of glass material (glass powder) is added in the process of sintering, the glass powder is bonded to the nano-sized or micro-sized particles of the UV-sensitive material within a temperature range from 500 to 600° C., and provides a good bonding effect. The addition of proper binder into the nano-sized or micro-sized particles of the UV-sensitive material may also change some mechanical properties of the UV-sensitive layers 3, 3a, 3b, such as the toughness, the hardness, and the rigidity thereof, without adversely affecting the ultraviolet sensing ability of the UV-sensitive layers 3, 3a, 3b included in the present invention.

Unlike the conventional ultraviolet sensor that could respond only to the ultraviolet light incident thereon from a particular direction, the ultraviolet sensor of the present invention having a UV-sensitive layer formed by sintered particles of UV-sensitive material is able to receive ultraviolet rays incident thereon from multiple directions. Moreover, the UV-sensitive layer of the ultraviolet sensor of the present invention has high-voltage endurance capability to thereby provide very good industrial and commercial value.

What is claimed is:

1. A multidirectional ultraviolet sensor for sensing an ultraviolet light, comprising:
    a substrate having a top surface;
    a UV-sensitive layer formed on the top surface of the substrate and consisting of particles of irregular shapes of a UV-sensitive material and a binder applied on the top surface of the substrate, said irregularly shaped particles and said binder being attached to said substrate through a process of sintering within a temperature range between 500° C. and 600° C., the UV-sensitive layer having an impedance changeable in response to an intensity of the sensed ultraviolet light;
    a first electrode layer formed at a first position in contact with the UV-sensitive layer; and
    a second electrode layer formed at a second position in contact with the UV-sensitive layer, spaced from the first electrode layer.

2. The multidirectional ultraviolet sensor as claimed in claim 1, wherein the particles of the UV-sensitive material are screen-printed on the top surface of the substrate and then attached thereto through the process of sintering.

3. The multidirectional ultraviolet sensor as claimed in claim 1, wherein the UV-sensitive material comprises zinc oxide.

4. The multidirectional ultraviolet sensor as claimed in claim 1, wherein the UV-sensitive material comprises titanium dioxide.

5. The multidirectional ultraviolet sensor as claimed in claim 1, wherein the UV-sensitive material comprises silicon carbide.

6. The multidirectional ultraviolet sensor as claimed in claim 1, wherein the binder comprises a glass material.

7. The multidirectional ultraviolet sensor as claimed in claim 1, wherein the particles of the UV-sensitive material comprise nano-sized particles.

8. The multidirectional ultraviolet sensor as claimed in claim 7, wherein the nano-sized particles of the UV-sensitive material have a size smaller than 100 nanometers.

9. The multidirectional ultraviolet sensor as claimed in claim 1, wherein the particles of the UV-sensitive material comprise micro-sized particles.

10. The multidirectional ultraviolet sensor as claimed in claim 9, wherein the micro-sized particles of the UV-sensitive material have a size smaller than 30 micrometers.

11. The multidirectional ultraviolet sensor as claimed in claim 1, wherein the first electrode layer is an electrically conductive material.

12. The multidirectional ultraviolet sensor as claimed in claim 1, wherein the second electrode layer is an electrically conductive material.

13. The multidirectional ultraviolet sensor as claimed in claim 1, wherein the first and the second electrode layer are intermeshed comb structures.

14. The multidirectional ultraviolet sensor as claimed in claim 1, wherein the substrate is made of a material selected from the group consisting of a glass material and a ceramic material.

15. The multidirectional ultraviolet sensor as claimed in claim 1, wherein the first and the second electrode layer are both formed on a top surface of the UV-sensitive layer.

16. The multidirectional ultraviolet sensor as claimed in claim 1, wherein the first and the second electrode layer are both formed on the top surface of the substrate and covered by the UV-sensitive layer.

17. The multidirectional ultraviolet sensor as claimed in claim 1, wherein the first electrode layer is formed on a top surface of the UV-sensitive layer, and the second electrode layer is formed between a bottom surface of the UV-sensitive layer and the substrate.

* * * * *